(No Model.)  6 Sheets—Sheet 1.

G. W. LIEB.
MACHINE FOR MAKING BUTTON BACKS.

No. 492,534.   Patented Feb. 28, 1893.

WITNESSES:
Charles Schrader
William Duehm

INVENTOR
G. W. Lieb
BY Guepel & Raegener
ATTORNEYS.

(No Model.)

G. W. LIEB.
MACHINE FOR MAKING BUTTON BACKS.

No. 492,534.   Patented Feb. 28, 1893.

WITNESSES:
INVENTOR
G. W. Lieb
BY
Goepel & Raegener
ATTORNEYS.

(No Model.) 6 Sheets—Sheet 4.
G. W. LIEB.
MACHINE FOR MAKING BUTTON BACKS.
No. 492,534. Patented Feb. 28, 1893.
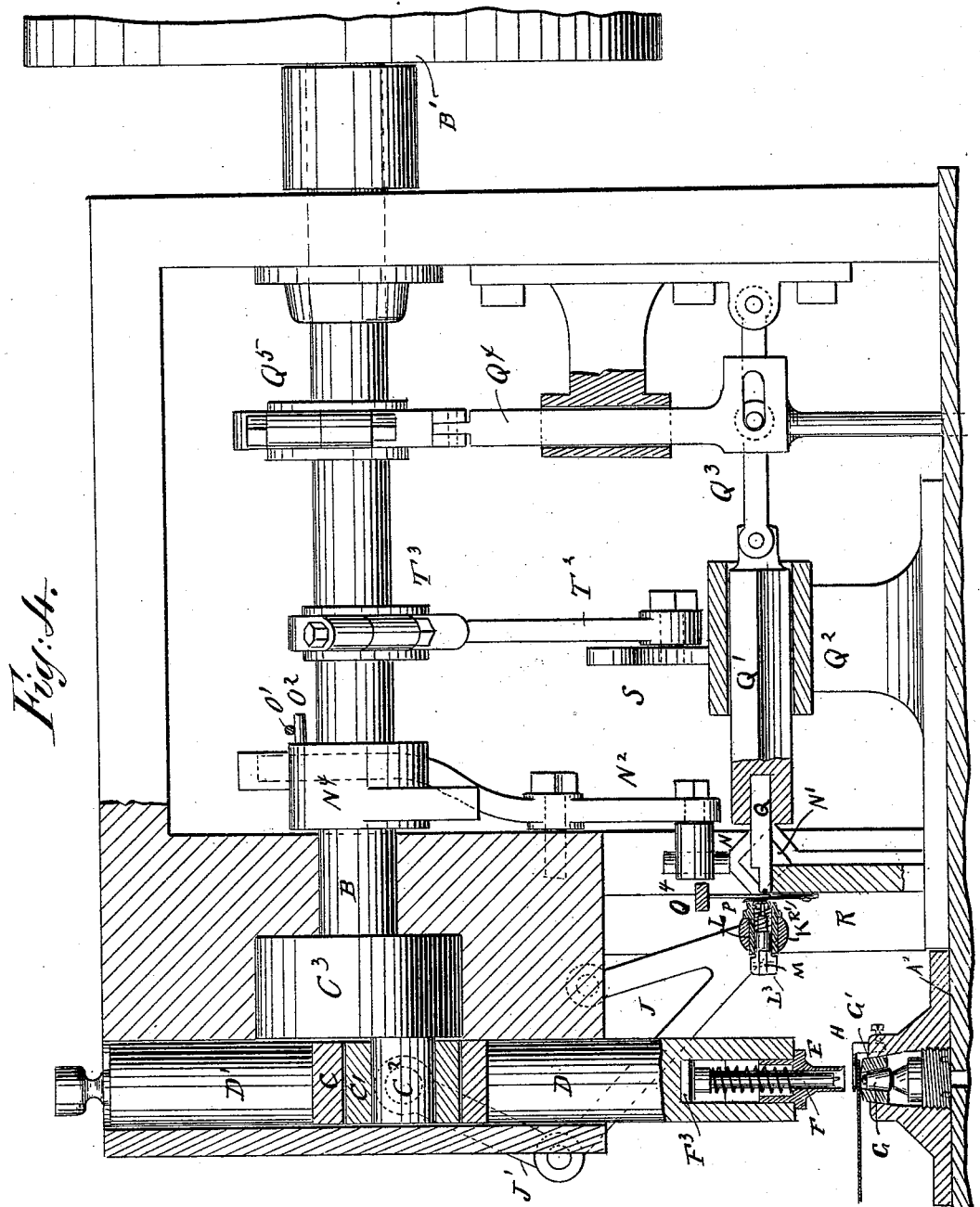
WITNESSES:
Charles Schroeder
William Duehrn
INVENTOR
G. W. Lieb
BY Geipel & Raegener
ATTORNEYS.

(No Model.) 6 Sheets—Sheet 5.
G. W. LIEB.
MACHINE FOR MAKING BUTTON BACKS.
No. 492,534. Patented Feb. 28, 1893.
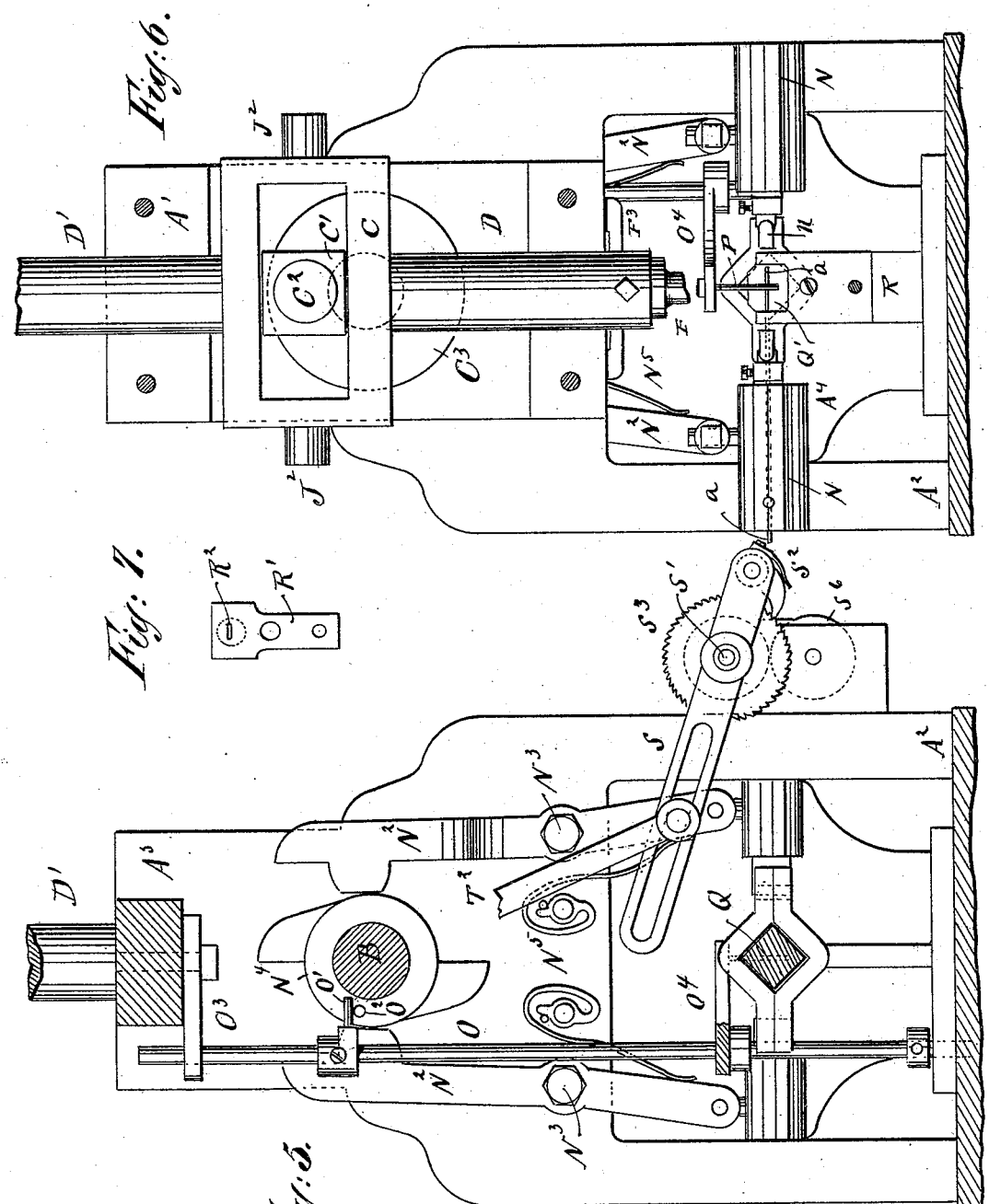

(No Model.) 6 Sheets—Sheet 6.
G. W. LIEB.
MACHINE FOR MAKING BUTTON BACKS.
No. 492,534. Patented Feb. 28, 1893.
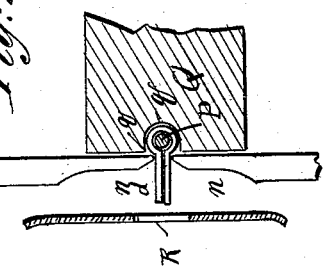
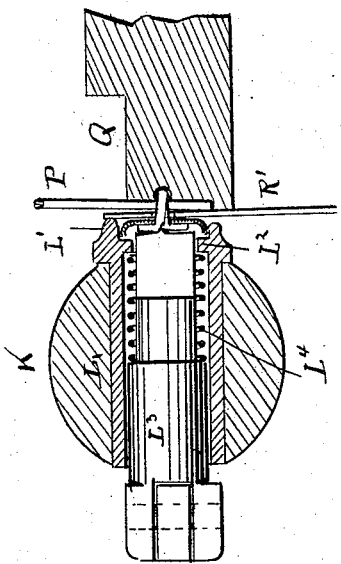
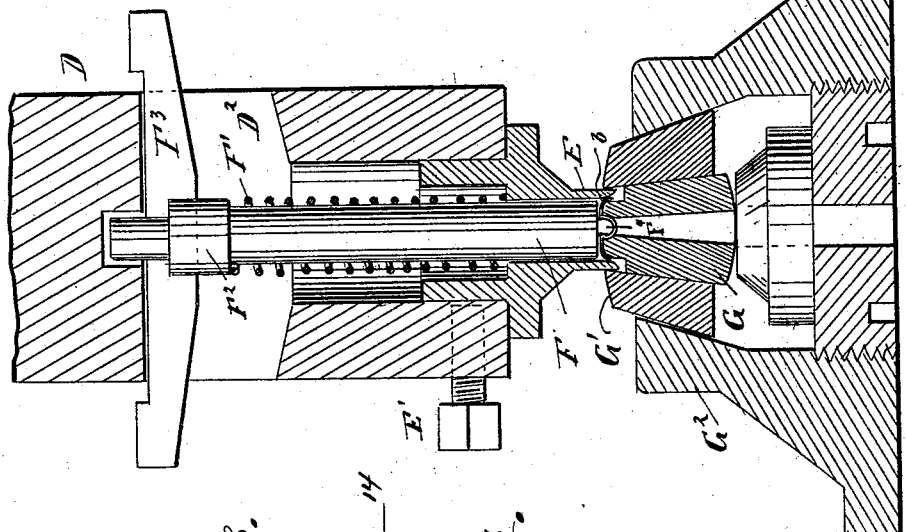
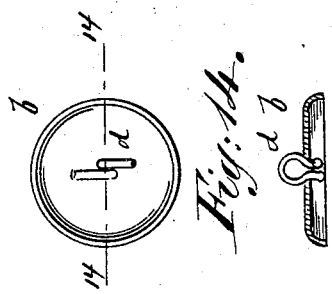
WITNESSES:
Charles Elrets
William Tübm
INVENTOR
G. W. Lieb
BY Goepel & Rueymer
ATTORNEYS.
THE NORRIS PETERS CO., PHOTO-LITHO., WASHINGTON, D. C.

UNITED STATES PATENT OFFICE.

GEORGE WM. LIEB, OF NEWARK, NEW JERSEY.

MACHINE FOR MAKING BUTTON-BACKS.

SPECIFICATION forming part of Letters Patent No. 492,534, dated February 28, 1893.

Application filed August 11, 1892. Serial No. 442,743. (No model.)

*To all whom it may concern:*

Be it known that I, GEORGE WM. LIEB, a citizen of the United States, residing at Newark, in the county of Essex, in the State of New Jersey, have invented certain new and useful Improvements in a Machine for Making Button-Backs, of which the following is a specification.

This invention relates to a machine for making button backs: and the object of my invention is to provide a machine of this kind which automatically punches out a sheet-metal back from a strip, shapes the same and provides it with an eye made of wire.

The invention consists in a machine for making button backs, constructed with a reciprocating punch, a swinging and rocking shaft having a sleeve for receiving the blanks from the punch and feeding them to mechanism for shaping an eye, which is inserted through an aperture in the blank, whereupon the shanks of the eye are spread on the inner surface of the blank. The several mechanisms for accomplishing these different steps are all operated from the same shaft and the several operations take place successively, and while one pair of blanks is being made by some of the mechanism another pair is being made by others.

The invention also consists in the construction and combination of parts and details which will be fully described hereinafter and finally pointed out in the claims.

Figure 1:
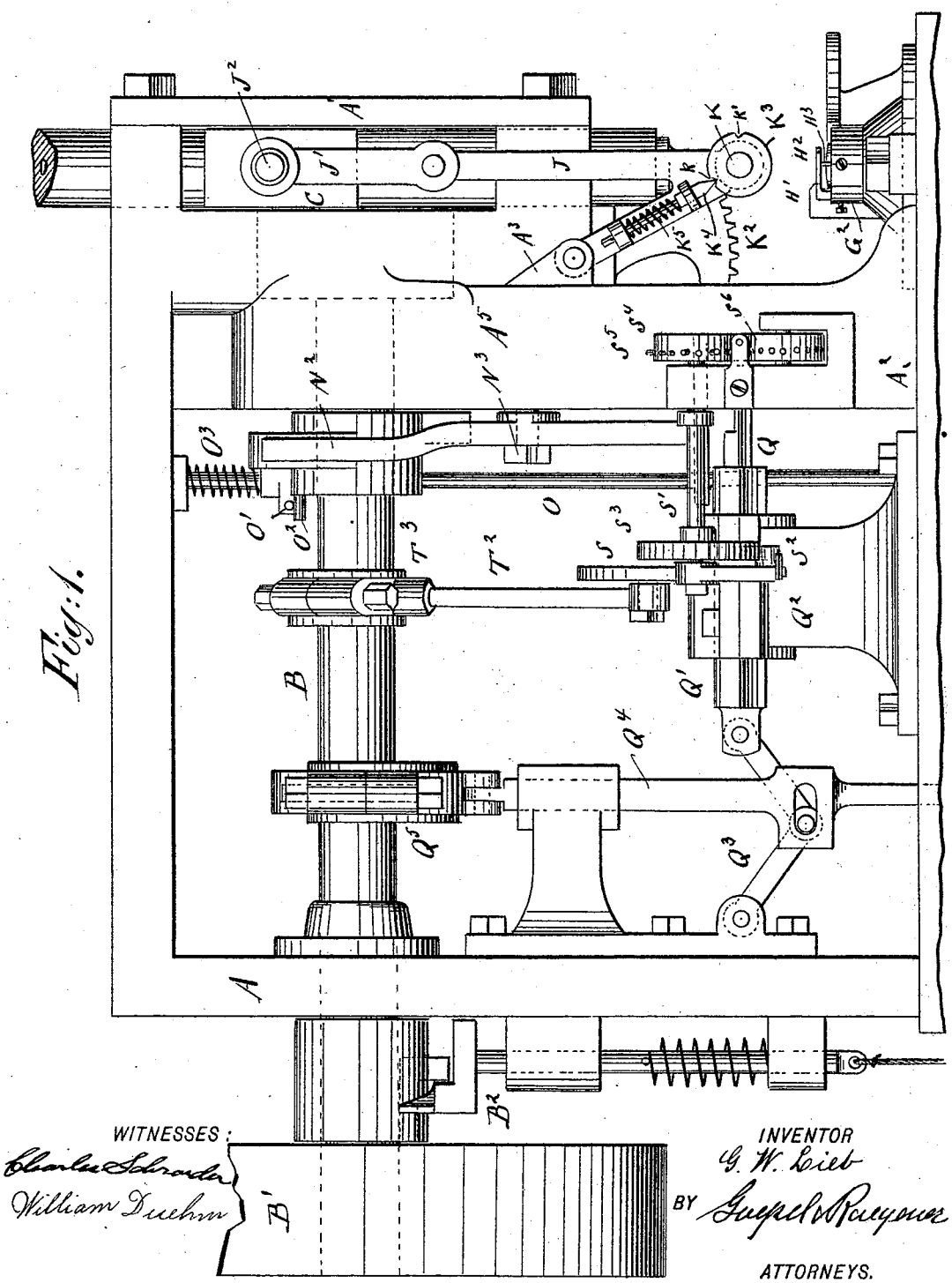
Figure 2:
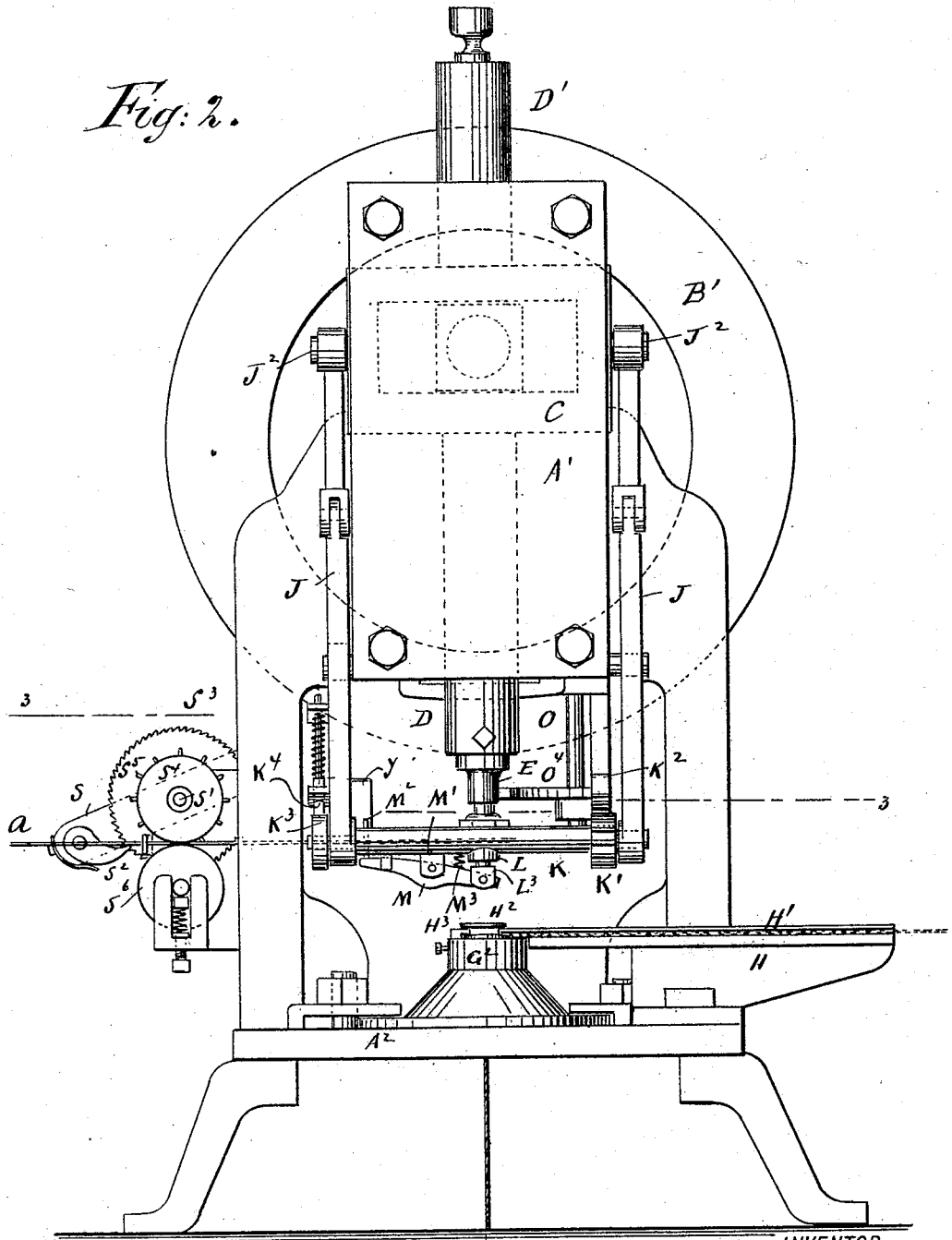
Figure 3:
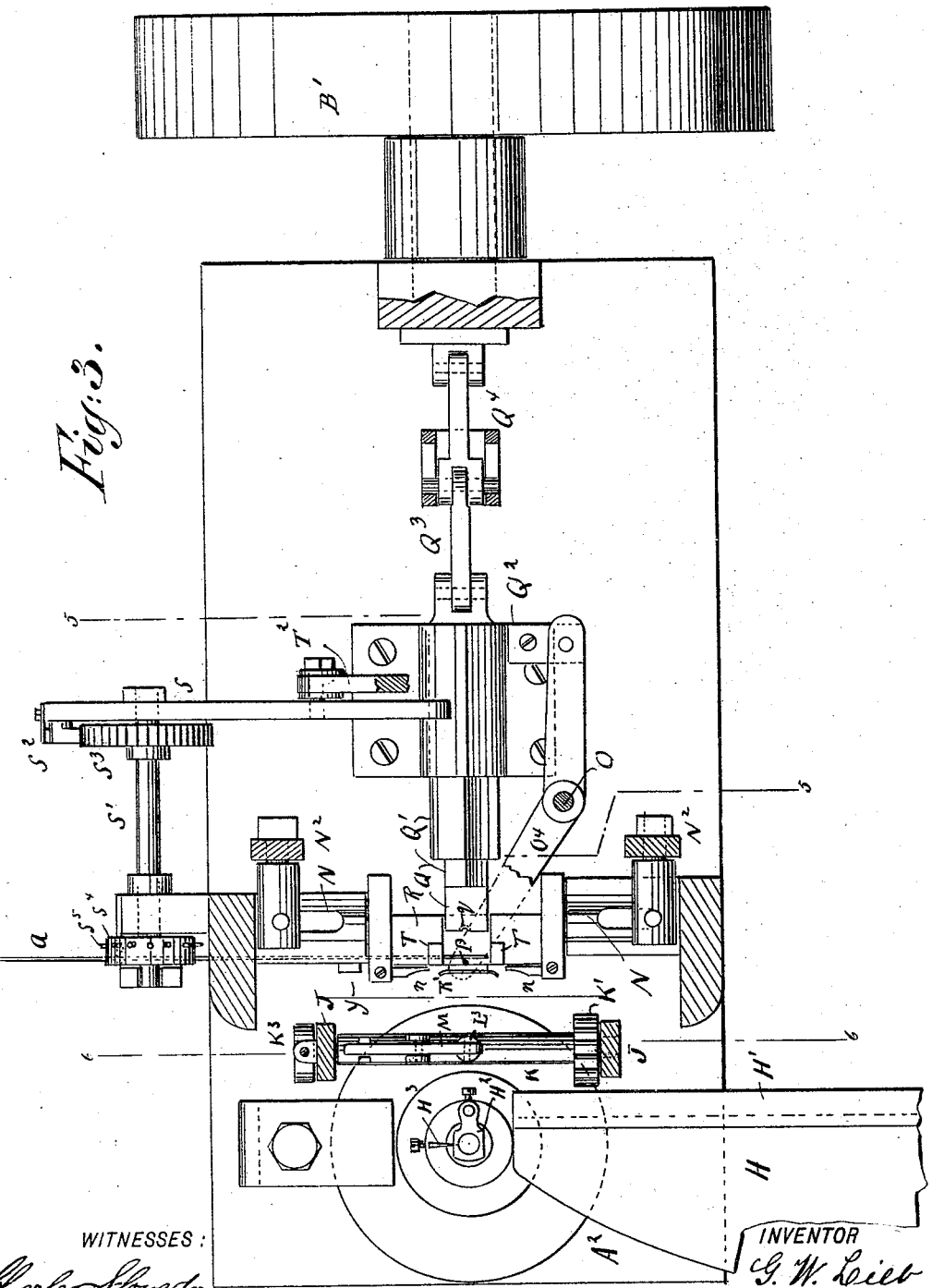

In the accompanying drawings, Figure 1 is a side-view of my improved machine for making button backs, parts being broken out. Fig. 2 is a front-elevation of the machine. Fig. 3 is a sectional plan-view of the same, on the line 3 3 of Fig. 2. Fig. 4 is a side-view of the machine, parts of the front end of the same being shown in longitudinal vertical section. Fig. 5 is a vertical transverse-sectional view of the machine, looking from the rear on the line 5 5, of Fig. 3. Fig. 6 is a vertical transverse sectional view of the machine, on the line 6 6, of Fig. 3. Fig. 7 is a detail view of the combined retaining and ejecting spring. Fig. 8 is an enlarged vertical transverse sectional view of the punch die. Fig. 9 is an enlarged transverse sectional view of the blank conveyer and punch. Fig. 10 is a similar view of the same showing another position. Fig. 11 is an end-view of the sliding spreading punch in the blank-conveyer. Fig. 12 is a horizontal sectional view of the combined retaining and ejecting spring, and a plan-view of the sliding jaws forming the eye around the point and of the anvil, Fig. 13 is an inside face-view of the button-back made by the machine. Fig. 14 is a cross-sectional view of the same, on the line 14 14, of Fig. 13.

Similar letters of reference indicate corresponding parts.

In the frame A the main-shaft B is suitably mounted to rotate, and is provided at one end with a belt-pulley B' and with a clutch mechanism $B^2$ of any well known construction, by means of which the belt-pulley B' can be coupled to the same. In a head A' at the front end of the machine the box-shaped frame C is guided, which frame C contains the block C' into which the eccentric pin $C^2$ of a disk $C^3$ on the front end of the shaft B passes, so that when said shaft B is rotated the box-shaped frame C is moved up and down in the head A'. A guide-stem D' D is secured to the top and bottom of the box-shaped frame C and guided in suitable openings in the top and bottom of the head A', so as to insure the true and vertical movement of said box-shaped piece and of said guide-stems. In the lower end of the stem D the tubular punch E is inserted and held in place by a binding-screw E'. A punch rod F, provided on its lower end with a perforating die $F^4$, is mounted to slide in the tubular punch E and is pressed upward by a helical spring F' surrounding it, the lower end of said spring resting on the base of a cavity in the punch E, and the upper end rests against the collar $F^2$ of said punch-rod F. Said punch-rod F is provided at its upper end with a cross-piece $F^3$ that can move up and down in a transverse slot $D^2$ of the stem D. The tubular die G is held in the tapering holder G' placed into a socket $G^2$ that is suitably clamped on the base-plate $A^2$ of the machine frame, said die and its holder being so shaped that the bottom edge of the tubular punch E can pass into the latter, as shown in Fig. 8.

On the base-plate $A^2$ of the machine a suitable guide H having the longitudinal groove H' for guiding a sheet of metal is fastened, the end of said guide H lapping over the top of the die-holder socket $G^2$. To the socket $G^2$ an L-shaped arm $H^2$ is fastened, which projects over the die H and is provided in its top with an aperture through which the punch can pass. A stop-pin $H^3$ is also fastened on the socket $G^2$ and projects over the top of the die-holder $G'$, as shown in Fig. 3, the said stop-pin $H^3$ being so adjusted that its point is almost in contact with the surface of the tubular punch E when the latter descends. At each side of the head $A'$ a bracket $A^3$ is arranged on the front end of the machine, and to each bracket a V-shaped lever J is pivoted, which has shanks of different lengths the shorter shanks being pivoted to the said bracket $A^3$. The longer shanks of the lever J are pivotally connected by the links $J'$ with the trunnions $J^2$ projecting from the ends of the box C guided in the head $A'$. In the apex of said V-shaped levers J a shaft K is mounted, on which is fixed at one end a toothed-wheel $K'$ adapted to engage the teeth of a segmental rack $K^2$ projecting from the front of the machine frame at the bottom of the head $A'$, as shown in Fig. 1. At the opposite end the shaft K is provided with a disk $K^3$ having two notches $k$ $k'$ that can be engaged by a sliding pawl $K^4$ guided on the outer surface of one of the short shanks of one of the V-shaped levers J, and said sliding pawl K is pressed against the rim of the disk $K^3$ by a helical spring $K^5$ surrounding the stem of said pawl. In the center of said rocking shaft K a tube L is fixed transversely and is provided at one end with an annular rounded rim $L'$ projecting beyond the circumference of the shaft K and a short distance inward from said rounded rim $L'$, with an annular ledge $L^2$. A punch $L^3$ is mounted to slide in said tube L and is pressed in the direction from that end of the tube provided with the rounded rim $L'$ by a helical spring $L^4$, of which one end bears against the inner edge of the ledge $L^2$ and the other end against a shoulder of the sliding punch. Said sliding punch has one end provided with two raised parts $l$ arranged at opposite sides of the center of the end surface of the punch and a short distance from said center, the surface of the end of the punch being inclined from each raised part, as shown in Fig. 11. A lever M is pivoted to lugs $M'$ projecting from the shaft K, and has one end pivoted to the forked end of the punch $L^3$ and the other end of said lever is provided with a pin $M^2$ passing through a transverse aperture of the shaft K. A spring $M^3$ interposed between the lever M and the shaft K serves to press that end of the lever M connected with the punch $L^3$ outward.

On standards $A^4$ secured on the base-plate $A^2$ of the machine two prismatic guides N are arranged horizontally, one at each side of the longitudinal axis of the machine, and said guides each contain a sliding piece $N'$, of which each is pivotally connected with a lever $N^2$ pivoted at $N^3$ to the rear side of the front standard $A^5$ of the machine, the upper ends of said levers $N^2$ being at opposite sides of a cam-disk $N^4$ secured on the shaft B. Springs $N^5$ fastened to the rear side of the standard $A^5$ bear with their lower ends on the lower ends of the lever $N^2$ and press the same and the sliding-pieces $N'$ connected therewith from each other. To each sliding piece $N'$ a jaw $n$ is fastened provided at its free end with a beveled edge $n'$ for a purpose that will be described hereinafter.

The shaft O is guided to move vertically on the machine frame and is provided with a pin $O'$, on which a pin $O^2$ on the collar of the cam $M^4$ can act so as to raise said rod $O'$ for each rotation of the shaft, said rod descending under the action of a spring $O^3$ surrounding the same. Said vertically-reciprocating rod O is provided with an arm $O^4$ from the end of which a pin P projects downward in front of the end of a horizontally-reciprocating anvil Q held in the end of a reciprocating piece $Q'$ mounted in a sleeve on the upper end of a standard $Q^2$ on the base. The rear end of said sliding piece $Q'$ is connected with a toggle-lever $Q^3$, the knuckle of which is connected with a vertically-reciprocating rod $Q^4$ that is actuated by an eccentric $Q^5$ on the driving-shaft B, as shown in Figs. 1 and 4, so that every time the shaft B makes a rotation the sliding piece $Q'$ and the anvil Q in the same are moved forward. The end of said anvil slides over and rests upon a fixed guide-piece R on the base of the machine, and to the front of said fixed guide-piece a spring-strip $R'$ is secured, which is provided at its upper end with a transverse slot $R^2$. The anvil Q is provided in its front end with a vertical groove $q$ adapted to receive the pin P, and with a transverse notch $q'$. A longitudinally slotted rocking lever S is mounted to rock on the shaft $S'$ at the side of the machine frame, and said lever carries at one end a spring-pawl $S^2$ engaging a ratchet-wheel $S^3$ fixed on the shaft $S'$, and said shaft $S'$ also carries a wheel $S^4$ having pins $S^5$ on its rim, which pins $S^5$ enter notches in the rim of a wheel $S^6$ mounted in spring bearings in brackets on the side of the machine-frame. A wire $a$ is guided between the wheels $S^4$ and $S^6$ and is fed by the same into the machine frame. Said wire passes through suitable guides of the machine frame and through an aperture in a jaw T, of which there are two on the guide piece R and which guide the anvil. The slotted lever S is worked up and down by a rod $T^2$, which in turn is actuated by an eccentric $T^3$ on the main driving shaft B.

The operation is as follows:—The sheet-metal, such as tin is conducted through the guide groove $H'$ of the metal guide H until its end strikes the stop-piece $H^3$. The shaft B is then coupled to the driving mechanism by means of the clutch previously described and the tubular punch E is forced down and cuts out a circular blank $b$, and at the same time the punch-rod F is forced down and its teat F⁴ punches a hole through the center of the blank. The blank *b* that has been punched out remains in the tubular punch E and rises with the same when the punch-rod makes its return stroke. During the time that this punching operation is taking place the shaft K is in the position shown in Fig. 4. As the punch-rod D rises, the shaft K is swung to the front, and as its pinion K' engages the segmental rack K² and from its position in Fig. 10 into the position shown in Fig. 9. By this time the punch-rod is moved up to such an extent that the cross-rod F³ strikes against the bottom of the head A' whereby the punch rod F is arrested, and as the tubular punch E moves upward said punch-rod F forces the blank *b* out of the tubular punch E and into the end of the sleeve L, as shown in Fig. 9. That is, the punched blank has been conveyed from the tubular punch into the end of the sleeve L. The punch-rod D is now in its raised position. When it again descends to punch out a new blank, the shaft K is swung from the position shown in Fig. 1 into the position shown in Fig. 4, and by the action of the segmental rack and pinion on said shaft it is turned ninety degrees and brought into the position shown in Fig. 10. In the meantime a wire *o* has been fed by the wire-feeding device through the jaw T, as shown in Fig. 6, and the arm O⁴ and its pin P have descended so that the latter extends across said wire. The anvil Q is now pushed forward in the direction of its length and in moving forward first cuts off the wire by the shearing action against the jaw T and presses said wire against the pin P. By the action of the sides of the recess Q and notch Q' the wire that has been cut off is bent around the pin P. The two slides N now move toward each other and the jaws *n* of the same acting on the wire bend the same to project at right-angles to the direction in which the wire is fed and shape it so as to form an eye *d* around the pin P, as shown in Fig. 12. By the time this wire is bent in this manner the shaft K has brought the punched blank *b* held in the end of the sleeve L against the spring R' and has pressed said spring against the end of the anvil, compelling the shanks of the eye thus formed to pass through the opening of the blank *b*. By this time the pin M² on one end of the lever M has struck against the lug *g* on the front of the frame of the machine and has been forced outward, whereby the other end of the lever M is forced inward and presses the shaping end of the punch L³ against the shanks of the eye and bends said shanks in opposite direction on the inner face of the blank, as shown in Fig. 10. The button is now held by the spring R', by the end of the sleeve L, by the anvil and by the pin P. The shaft K now recedes, the pin P is moved upward thereby releasing the eye of the button, and the spring R' throws the button back formed outward.

While each of the several operations is taking place another operation is also taking place on a different blank. For example, a blank is punched out, and is then transferred to the sleeve L of the shaft K and while it is being conducted by said shaft K to the end of the anvil, the punch descends to cut out a fresh blank, and while the shaft K swings toward the end of the anvil, the wire is being fed forward, cut off and bent around the pin P and is shaped by the jaws so as to give the eye the proper shape ready for the blank when the same is brought up against the end of the anvil.

Having thus described my invention, I claim as new and desire to secure by Letters Patent—

1. A machine for making button backs, constructed with a reciprocating punch for punching out blanks, a swinging shaft suspended from said punch, a cog-wheel on said shaft and a fixed segmental rack engaging said cog-wheel for the purpose of rotating the shaft, substantially as set forth.

2. A machine for making button backs, constructed with a reciprocating punch, a rocking and swinging shaft suspended from said punch, a rack and cog-wheel for rotating said shaft and a spring pawl piece for locking the shaft in different positions, substantially as set forth.

3. In a machine for making button backs, the combination, with a reciprocating punch, of a swinging and rotating shaft operated from said punch, a transverse sleeve held in said shaft and a punch in said sleeve, substantially as set forth.

4. In a machine for making button backs, the combination, with a reciprocating punch, of a swinging and rocking shaft suspended from said reciprocating punch, a transverse sleeve in said shaft, a punch in said sleeve, a lever pivoted on the shaft and pivotally connected with said punch and means for operating said lever and the punch when the shaft swings against a fixed frame of the machine, substantially as set forth.

5. In a machine for making button backs, the combination, with a reciprocating punch, of a swinging and rocking shaft suspended from the punch, a transverse sleeve in said shaft, a punch in said sleeve, a lever pivoted on the shaft and pivotally connected with said punch in the sleeve and a pin projecting from the opposite end of said lever to the rocking shaft, which pin is adapted to strike against a lug on the frame of the machine, substantially as set forth.

6. In a machine for making button backs, the combination, with a tubular punch, of a movable punch rod in the same a cross-piece connected with the movable punch rod and adapted to strike against a head of the machine frame and a swinging and rocking shaft having a transverse sleeve for receiving the punched blank, substantially as set forth.

7. In a machine for making button backs, the combination, with a reciprocating tubular punch, of a movable punch rod in the same, a cross-piece on said sliding punch adapted to strike against a head, of the machine frame, a swinging and rocking shaft operated from the holder of the reciprocating punch and a sleeve in said rocking shaft adapted to receive the blank punched out of the metal by the above mentioned tubular punch, substantially as set forth.

8. In a machine for making button backs, the combination, with a reciprocating punch, of levers pivoted to the machine frame and pivotally connected with the punch, a segmental rack projecting from the machine frame, a rocking shaft mounted in said pivoted levers, a ratchet-wheel on said rocking shaft engaging the rack projecting from the machine frame and a blank receiving sleeve mounted in said rocking and swinging shaft, substantially as set forth.

9. In a machine for making button backs, the combination, with a punch and blank conveyer, of a reciprocating wire cutter, and apertured spring in front of the same and a vertically movable pin mounted to pass in between the end of the wire-cutter and the said spring, substantially as set forth.

10. In a machine for making button backs, the combination, with a punch and a conveyer for conducting the blank from the punch, of a wire-feeding device, a reciprocating wire-cutter, a reciprocating pin adapted to pass in front of the wire cutting device and laterally movable jaws for bending the wire around said pin, substantially as set forth.

11. In a machine for making button backs, the combination, with a reciprocating punch, of a conveyer for receiving the blank from the punch, a wire feeding device, a reciprocating wire cutter, a movable pin in front of the wire cutter, laterally movable jaws in front of the wire cutter for shaping the wire around the pin to form an eye and means for spreading the shanks of the eye after they have been passed through an aperture in the blank, substantially as set forth.

12. In a machine for making button backs, the combination, with a reciprocating punch, of a swinging and rocking shaft having a sleeve for receiving a punched blank, a punch in said sleeve a wire feeding device, a reciprocating wire-cutting device, a movable pin in front of the wire cutter and laterally movable jaws for bending the wire around the pin, substantially as set forth.

13. In a machine for making button backs, the combination, with a punch and a blank conveyer for receiving the blank from the punch, of a wire-feeding device, a wire guide, a sliding anvil having a groove and notch in its end, laterally reciprocating jaws in front of the anvil and an apertured spring held in front of said anvil, substantially as set forth.

14. In a machine for making button backs, the combination, with a driving shaft, of a punch operated from the driving shaft, a blank conveyer operated from the driving shaft, a longitudinally reciprocating wire-cutting device operated from the driving shaft and a vertically movable pin also operated from the driving shaft, around which pin the wire can be bent to form an eye, substantially as set forth.

15. In a machine for making button backs, the combination, with a driving shaft, of a punch operated from the driving shaft, a blank conveyer operated from the punch, a wire feeding device operated from the driving shaft, a longitudinally reciprocating wire-cutting device operated from the driving shaft, a vertically movable pin also operated from the driving shaft, around which pin the wire can be bent to form an eye, and laterally movable jaws also operated from the driving shaft and serving to bend and shape the wire around said pin, substantially as set forth.

In testimony that I claim the foregoing as my invention I have signed my name in presence of two subscribing witnesses.

GEO. WM. LIEB.

Witnesses:
OSCAR F. GUNZ,
CHARLES SCHROEDER.